United States Patent [19]

Larsen-Moss et al.

[11] Patent Number: 5,294,260
[45] Date of Patent: Mar. 15, 1994

[54] APPARATUS FOR CURING COATINGS ON DRAWN OPTICAL FIBER

[75] Inventors: Lisa M. Larsen-Moss, Stone Mountain; Vernon W. Pidgeon, Jr., Suwanee, both of Ga.

[73] Assignee: AT&T Bell Laboratories, Murray Hill, N.J.

[21] Appl. No.: 969,665

[22] Filed: Oct. 30, 1992

[51] Int. Cl.$^5$ .......................... C03C 25/02; B05B 5/025
[52] U.S. Cl. ............................... 118/620; 118/420; 65/11.1; 65/3.43
[58] Field of Search ..................... 65/3.11, 3.12, 3.43, 65/11.1, 104; 427/513, 163; 118/672, 420, 620

[56] References Cited

U.S. PATENT DOCUMENTS

| | | | |
|---|---|---|---|
| 4,474,830 | 10/1984 | Taylor | 427/513 |
| 5,147,433 | 9/1992 | Petisce | 65/3.11 |
| 5,217,518 | 6/1993 | Petisce | 65/3.43 |

*Primary Examiner*—Robert L. Lindsay
*Attorney, Agent, or Firm*—Donald E. Hayes, Jr.

[57] ABSTRACT

A curing apparatus which is supported from a base plate (68) includes a housing which includes guide members for holding a magnetron and one portion of an elliptical chamber in which is disposed a longitudinally extending bulb. Outside the housing are triangular shaped gusset plates which are adapted to mate with a pivotally moveable portion (95) in which is disposed a mating portion of the elliptical chamber and a center tube through which the drawn optical fiber extends. An exhaust system is supported from the gusset plates. Advantageously, the pivotally moveable portion may be opened pivotally to expose the center tube and facilitate removal of the center tube and its replacement. Also advantageously, the entire curing apparatus may be aligned with the fiber by moving the base plate until the drawn fiber is centered within the center tube. In yet another advantage, the present invention incorporates a plurality of slidable plates to provide easy access to the magnetrons.

13 Claims, 4 Drawing Sheets

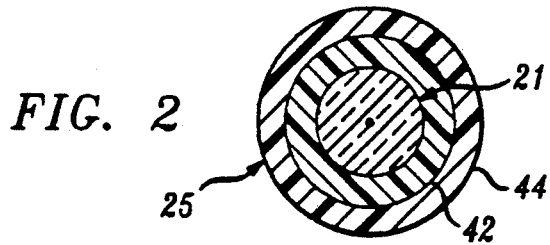
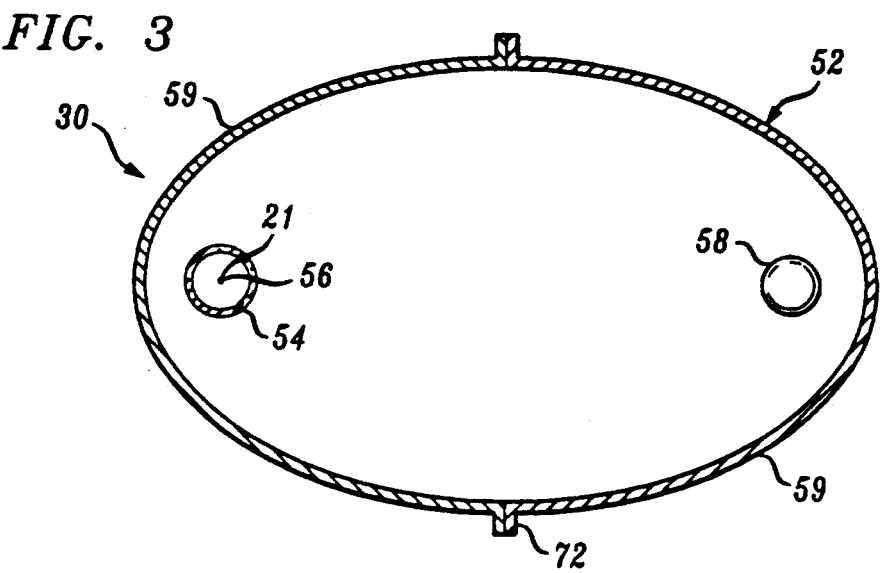
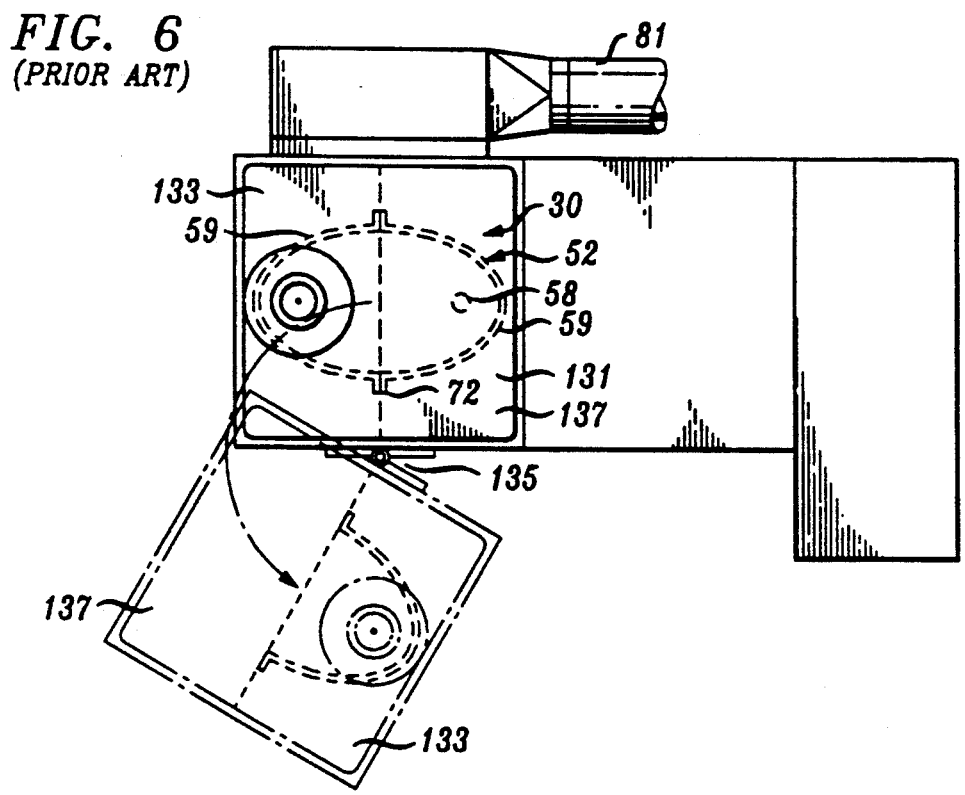

APPARATUS FOR CURING COATINGS ON DRAWN OPTICAL FIBER

TECHNICAL FIELD

This invention relates to an apparatus for curing coatings on drawn optical fiber. More particularly, the invention relates to an enclosure which provides access to curing lamps for coating materials which are applied to optical fiber drawn from a preform.

BACKGROUND OF THE INVENTION

In the manufacture of optical fiber, an optical glass preform is suspended vertically and moved so that successive increments of length are moved into a furnace. As a result of the temperature within the furnace, optical fiber is able to be drawn from the leading end of the preform.

After the fiber is drawn from the preform, the fiber is provided with one or more layers of coating material. Typically, the coating material is an ultraviolet light energy curable material. Consequently, after the coating material has been applied, the coating material is cured. Subsequently, the coated, drawn fiber is measured and taken up on a spool.

Typically, the curing apparatus includes an elliptical reflector or housing having a curing lamp which extends longitudinally parallel to the path of the fiber. The lamp or bulb as it frequently is called is positioned at one of the focal points of the elliptical reflector. The bulb emits radiation toward a longitudinally extending center tube, the center of which is positioned at the focal point of another portion of the elliptical housing aligned with the portion of the housing in which the bulb is positioned. The drawn optical fiber is advanced through the center tube and radiation from the bulb passes through the center tube to engage the fiber and cure the coating material. Radiation which scatters to the interior surface of the elliptical housing is reflected back into engagement with the fiber which is being moved along a path coincident with the loci of the focal points of successive sections of the reflector.

A blanket of an inert gas is caused to become disposed about the coated, drawn fiber as it is advanced through the center tube. This is done in order to facilitate surface curing of the coating materials. Otherwise, any oxygen which is present inhibits the curing of the coating material.

As the curing process proceeds, the optical fiber off-gases and clouds the tube. With the passage of time, the amount of radiation which reaches the fiber is reduced until a point is reached when substantially only a portion of the radiation gets through to the fiber. Accordingly, it becomes necessary periodically to change the center tube in order to maintain a consistent cure level.

Presently, the elliptical housing, the center tube and the bulb are disposed in the hinged enclosure having openings at the top and bottom thereof. When it comes time to replace a center tube, the center tube is moved in a longitudinal direction slidably upwardly or downwardly out of the enclosure and a replacement center tube moved into its place.

The existing center tube replacement process presents some practical problems. The optical fiber drawing line is oriented so that the fiber path is vertical and the preform is suspended vertically. Not only does the drawing line include a furnace, apparatus for the application of coating materials and curing apparatus, but also it includes apparatus for performing various measurements on the drawn and on the coated fiber. As a result, space on the line is at a premium. In order to gain access to the center tube, the enclosure is moved partially so that a production technician can extend hands into the enclosure and move the center tube longitudinally vertically. In order to remove a center tube by movement longitudinally vertically, an additional length of space must be provided above or below the curing apparatus or the curing apparatus must be dismantled substantially. This of course detracts from space available for other processes, given that there is a limited amount of space between a floor and a ceiling which can be occupied by a draw tower.

Also, the bulbs need to be cooled during operation, typically with a high flow rate of air. Exhaust ducts are attached to the enclosure and lead to fans which pull out the air. These are aligned vertically in sections and associated with each section is an exhaust duct system. In the past, these exhaust ducts have had to be removed from the enclosure prior to the pivotal movement of the enclosure and the removal of the interior center tube.

Of course, any solution to these problems must be mindful of the present arrangement of elements of the curing apparatus. It is usual that a set of magnetrons be disposed adjacent to an associated bulb and that the bulb, the center tube and the drawn optical fiber be aligned.

What is desired and seemingly what is not available in the prior art of curing apparatus for optical fiber coating material is an enclosure, which enclosure facilitates replacement of a center tube without the need for additional space above or below the enclosure or without the severe dismantling of the curing apparatus. The sought-after enclosure must be such that it does not interfere with the present alignment of elements of the curing apparatus and desirably is such that the exhaust system need not be disassembled from the curing apparatus prior to replacement of the center tube.

SUMMARY OF THE INVENTION

The foregoing problems of the prior art have been overcome by the curing apparatus of this invention. Apparatus for curing drawn optical fiber includes a housing which is closed on a top and bottom, sides and rear face thereof and which has openings in a front face thereof, the housing including a plurality of members extending therefrom. A pivotally moveable portion is hingedly connected to the housing and is adapted to be moved pivotally to expose an interior of the housing and an interior of the pivotally moveable portion. An elliptical chamber has a portion disposed in the housing and a separable portion disposed in the pivotally moveable portion. The center of a longitudinally extending bulb is disposed at the focal point of the portion of the elliptical chamber which is disposed in the housing. The center of a longitudinally extending center tube is disposed at the other focal point of the elliptical chamber such that the pivotal movement of the pivotally moveable portion facilitates lateral removal of the center tube from the elliptical chamber, the center tube adapted to have drawn optical fiber extend therethrough. Facilities are disposed in the housing for exciting the bulb to cause the bulb to emit radiation to cure curable coating material which has been applied to the fiber. Exhaust means which are attached to the housing for exhausting cooling gases from within said housing need not be removed from the housing in order to access the center tube.

The apparatus is oriented so that the longitudinal axis of the center tube is oriented vertically and wherein uppermost and lowermost openings through which the center tube extends are provided with sealing members.

BRIEF DESCRIPTION OF THE DRAWING

Other features of the present invention will be more readily understood from the following detailed description of specific embodiments thereof when read in conjunction with the accompanying drawings, in which:

FIG. 2 is an end sectional view of an optical fiber with dual layers of coating material disposed about a cladding of the fiber;

FIG. 3 is a schematic plan view of an arrangement for curing drawn optical fiber;

FIG. 6 is a plan view of a prior art enclosure.

DETAILED DESCRIPTION

Figure 1:
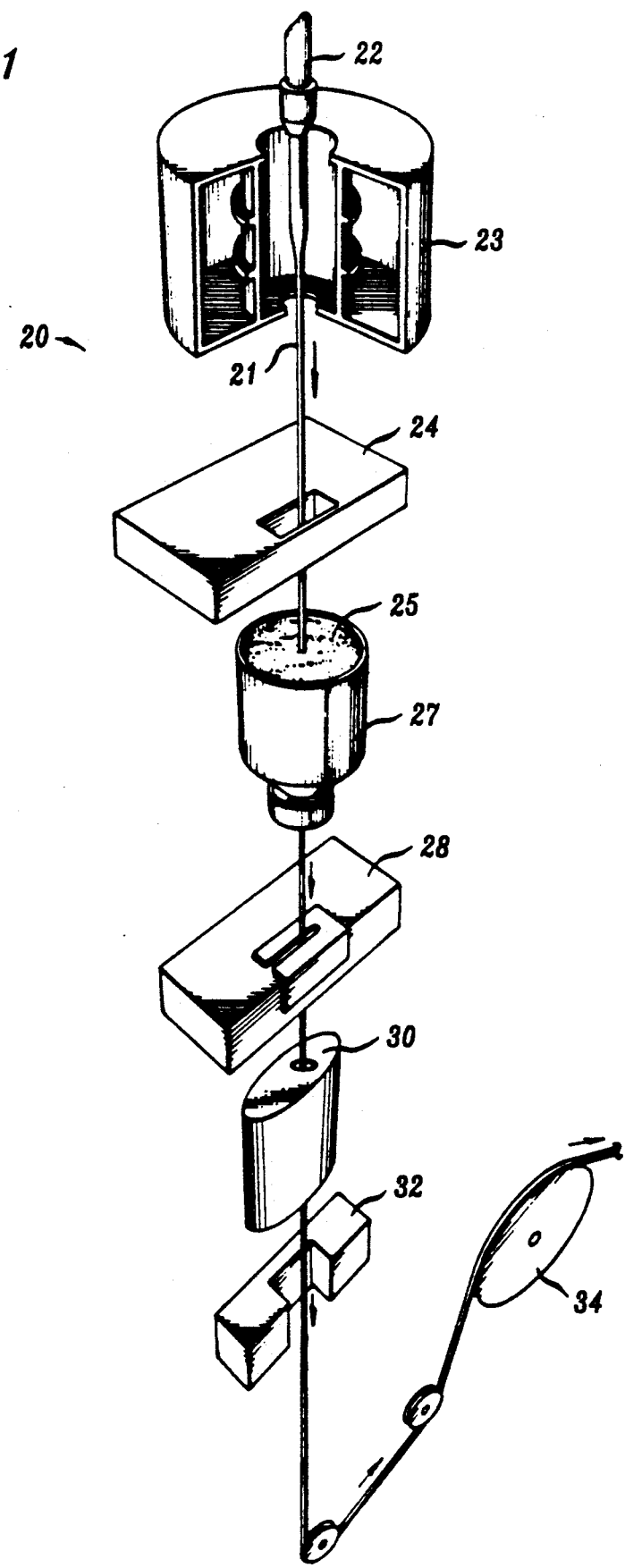
FIG. 1 is a perspective view of an optical fiber drawing line on which optical fiber is drawn from a vertically suspended optical preform.

Referring now to FIG. 1, there is shown an apparatus which is designated generally by the numeral 20 and in which is used to draw optical fiber 21 from a specially prepared cylindrical preform 22 and for then coating the drawn fiber. The optical fiber 21 is formed by locally and symmetrically heating the preform 22, typically 20 to 40 mm in diameter and 80 cm in length, to a temperature of about 2000° C. As the preform is fed into and through a furnace 23, fiber 21 is drawn from the molten material.

As can be seen in FIG. 1, the elements of the draw system include the furnace 23 wherein the preform is drawn down to the fiber size after which the fiber 21 is pulled from a heat zone therein. The diameter of the fiber 21 is measured by a device 24 at a point shortly after the fiber is formed and this measured value becomes an input into a control system. Within the control system, the measured diameter is compared to the desired value and an output signal is generated to adjust the draw speed such that the fiber diameter approaches the desired value.

After the diameter of the optical fiber 21 is measured, a protective coating system 25 (see also FIG. 2) is applied to the fiber by an apparatus 27. Preservation of fiber strength requires the application of the protective coating, which shields newly drawn fiber from the deleterious effects of the atmosphere. This coating system must be applied in a manner that does not damage the surface of the fiber 21 and such that the fiber has a predetermined diameter and is protected from abrasion during subsequent manufacturing operations, installation and service. Minimizing attenuation requires the selection of a suitable coating material and a controlled application of it to the fiber. Such a coating apparatus may be one such as that described in previously identified U.S. Pat. No. 4,474,830. Minimizing diameter variation which in turn minimizes the losses due to misalignment at connector and splice points requires careful design of the draw system and the continuous monitoring and control of the fiber diameter during the drawing and the coating steps of the process. Then, the coated fiber 21 is passed through a concentricity gauge 28.

After the coating materials have been applied to the drawn fiber, the coating materials must be cured. Accordingly, the optical fiber having the coating materials thereon is passed through a curing chamber 30 for curing the coating system and a device 32 for measuring the outer diameter of the coated fiber. Afterwards, it is moved through a capstan 34 and is spooled for testing and storage prior to subsequent cable operations.

In the apparatus 27, the protective coating system 25 comprising one or more layers of coating materials is applied to the optical fiber. The protective coating system 25 (shown in FIG. 2) includes an inner layer 42 which often is referred to as a primary coating material and an outer layer 44 which often is referred to as a secondary coating material. The coating material of the inner layer which has a substantially lower modulus than that of the outer layer, is such that it prevents microbending of the optical glass fiber. On the other hand, the higher modulus outer layer provides mechanical protection for the drawn glass fiber.

Each of the coating materials is curable by being exposed to a portion of the light spectrum. It is commonplace to use ultraviolet light curable coating materials which are crosslinked by a free radical polymerization mechanism. Generally each of the coating materials includes an oligomer, a diluent and a photoinitiator. Also included may be additives such as, for example, antioxidants, adhesion promoters, ultraviolet (UV) light stabilizers, surfactants and shelf life stabilizers.

The curing chamber 30 provides such enhanced curing of the coating material or materials. Typically, the curing chamber 30 (see FIG. 3) is provided with an elliptical housing 52. Disposed within the housing 52 is a quartz tube 54 having a longitudinal axis 56 parallel to that of the housing. The quartz tube 54 is adapted to have the drawn optical fiber 21 moved therethrough and has an inner diameter of about 2.5 cm and a thickness of about 1 mm. Also disposed within the housing 52 is an elongated quartz halogen lamp 58 which parallels the path of the optical fiber and which emits ultraviolet radiation that is used to cure the coating material or materials. The lamp 58 and the quartz tube 54 through which the fiber is moved are located at the focii of elliptical mirrors 59–59 to ensure that substantially all of the periphery of a moving optical fiber is impinged by light emitted by the lamp 58.

The quartz tube 54, through which the optical fiber is moved, is transparent to ultraviolet radiation from the lamp. Consequently, the use of such a tube does not impair the curing of the coating material on the moving optical fiber. The ultraviolet curing of the coating materials on the optical fiber is accomplished with energy in the wavelength range of about 200 to 400 nm.

Typically a curing apparatus on a fiber draw line includes more than one bulb with multiple bulbs being aligned longitudinally. Of course, such an arrangement may include multiple center tubes.

Figure 4:
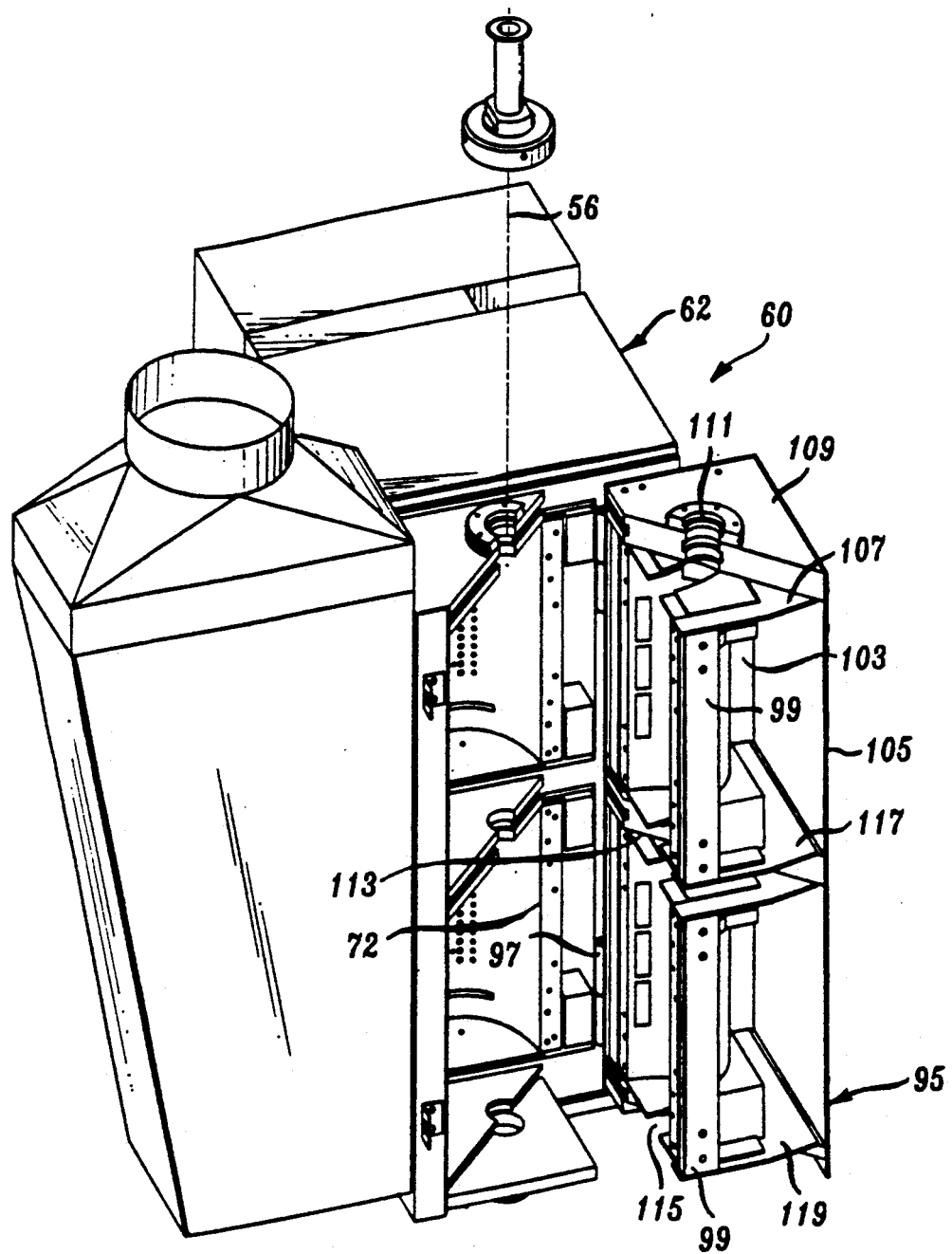
FIG. 4 is a perspective view of an enclosure which is used to house elements of the arrangement of FIG. 3.

The curing apparatus just described is housed in an enclosure which is depleted in FIG. 4 and which is designated generally by the numeral 60. As can be seen in FIG. 4, the enclosure of the present invention includes a housing 62 which in end section is rectangularly shaped and which generally comprises two or more stacked sections. The housing 62 includes an end frame 64 (see FIG. 5) and side frames 66–66, a base plate 68 and a cover 69. The end frame 64 and the side frames 66–66 extend between the base and the cover. Disposed in the housing 62 is one portion 59 of the elliptical chamber, the portion in which is disposed the bulb 58. The portion 59 along free longitudinal edges is provided with flanges 72–72 (see FIG. 3) which become abutting surfaces when the other portion 59 of the elliptical chamber is caused to be assembled thereto. Sides of the housing 62 are provided with walls 76–76 and a rear portion of the housing is provided with filters (not shown). As can best be seen in FIG. 5, during the operation of the curing apparatus, room air is drawn in through the filters, through the elliptical curing chamber 30 and out through an exhaust plenum 81. In order to allow passage of the room air, the end frame 64 is provided with two openings 79–79. Also, the end frame 64 is provided with spaced hinge portions 80–80.

Supporting an exhaust plenum 81 for the room air are three gusset plate assemblies 82, 84 and 86, each of which includes a triangular-shaped portion. The topmost two gusset plates are triangularly shaped and have semi-circular openings 83 and 85 formed therein. A lowermost gusset plate assembly includes a triangular plate 86 having a semi-circular opening 87 therein and a rectangular plate 88 having a circular opening 89 therein. A vertical stringer 91 spans from the top to the bottom gusset plates. The stringer 91 includes a longitudinal edge surface 93. The exhaust plenum 81 includes openings 90–90 each of which is aligned with an opening 79 in the end frame 64.

Returning now to FIG. 4, it is seen that the enclosure 62 also includes a pivotally moveable portion 95 which includes hinge portions 97–97 which are assembled to the hinge portions on the end frame 64 at hinges 80–80. The portion 95 includes a series of frame members 99–99 to support sidewalls 103–103. A rear wall 105 spans between the sidewall 103–103.

At the top of the portion 95 is disposed a plate 107 which is adapted to be moved slidably under the topmost gusset plate assembly 82 of the housing 62 when the pivotally moveable portion is closed on the housing 62. The top portion also includes a trapezoidal portion 109 having semi-circular opening 111 therein. When the pivotally moveable portion is closed on the housing 62, the semi-circular opening 111 cooperates with the semi-circular opening 83 to provide a circular opening. Further, semi-circular openings 113 and 115 in plate portions 117 and 119 of the pivotally moveable portion 95 cooperate with the semi-circular openings 85 and 87 to provide circular openings.

When the apparatus is in the position shown in FIG. 4 with the pivotally moveable portion in an open position, the center tube 54 which is not shown in FIG. 4 is inserted to span between the same semi-circular openings 83 and 85 and between the semi-circular openings 85 and 87 and the circular opening 89. Prior to that insertion, the center tube 54 is provided with gasket-sealing material so that when the pivotally moveable portion is closed on the housing 62, a seal is provided about the center tube 54 where the center tube passes through the gusset plate assemblies. Also, when the pivotally moveable portion is closed on the housing 62, portions thereof having sealing material adhered thereto engage the longitudinal edge surface 93 of the stringer 91 (see FIG. 5) to form a seal.

Figure 5:
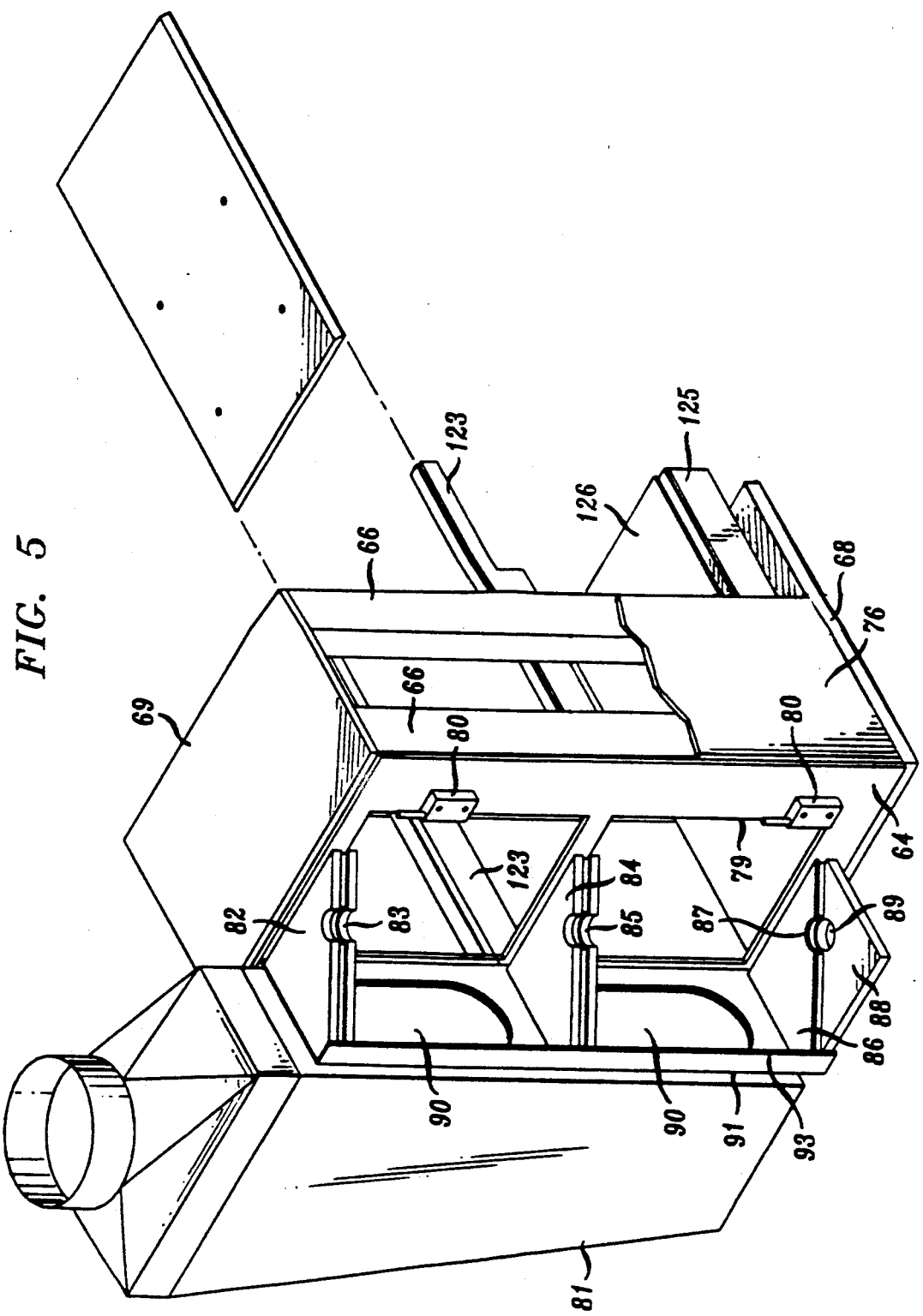
FIG. 5 is another perspective view of a portion of the enclosure of FIG. 4.

Magnetrons (not shown) adapted to provide suitable excitation for the bulbs 58–58 (see FIG. 3) are moved slidably into the housing from a rear portion thereof along guide rails 123–123 and 125–125. In FIG. 5, the lowermost rails 125–125 are shown provided with a plate 126 for holding magnetron apparatus, a curing bulb and one portion of the elliptical housing 52. Of course, the rails 123–123 also would be provided with such a plate. This facilitates the positioning of the magnetrons substantially close to the portions of the elliptical chambers disposed within the housing 62 and hence substantially close to the bulbs.

Drawn optical fiber is moved through the center tube 54 and an inert gas such as nitrogen is moved into a lower end of the center tube, flowed therealong and exhausted at the top of the tube by a separate exhaust system (not shown). Also, room air is pulled by fans (not shown) through filters (not shown), across the magnetrons, through the elliptical chamber, through the openings 79–79 and 90–90, and out the exhaust system 81.

The apparatus 60 is advantageous over enclosures of the prior art. Because of the pivotally moveable portion 95, the enclosure may be opened to permit the center tube or tubes to be exposed and removed laterally instead of longitudinally as required in the past. This of course results in less space needed on the draw line or, if already provided, can be used for other purposes. This is apparent from a comparison of FIGS. 4 and 6. As will be recalled, FIG. 4 depicts the arrangement of this invention with the center tube 54 adapted to be disposed in the openings 83, 85 and 87. When the pivotally moveable portion 95 is moved to the position shown in FIG. 4, the center tube 54 is exposed and a production technician may easily replace it.

In FIG. 6 which typifies prior art curing apparatus, a portion 59 of the housing 52 which includes the bulb 58 is disposed within a stationary enclosure 131. The other portion 59 of the housing 52 is disposed within a moveable enclosure 133 which is pivotally moveable about a pivot point 135. As is seen in FIG. 6, the pivotal movement of the portion 133 to the position shown in FIG. 6 does not allow freedom of movement laterally of the center tube 54. The center tube 54 continues to be captured in circular openings along the height of the moveable enclosure thereby necessitating longitudinal movement to replace it.

In particular, portions 137–137 project from the top and bottom of the pivotally moveable portion 133 (only the top portion 137 being visible in FIG. 6). The portions 137–137 overlap the portion 131 when the portion 133 is moved pivotally to cause the elliptical housing portion in the stationary enclosure 131 to abut its mating elliptical housing portion in the pivotally moveable portion 133.

Therefore, the prior art curing apparatus shown in FIG. 6 contrasts with the arrangement of this invention. Specifically, in the present invention the pivotal movement of a portion of the enclosure removes a portion of the enclosing wall of an opening in which the center tube is disposed, thereby allowing lateral movement of the center tube for replacement purposes.

Another advantage comes about because there is now no need to remove the exhaust system from the side of the enclosure prior to removal of the center tube. The exhaust system may remain in place attached to the gusset plates while the pivotally moveable portion is swung open giving access to the center tube or tubes thereby facilitating removal.

Also, the magnetrons, bulbs and portion of the elliptical housing may be moved slidably along the plates on the guide rails 123–123 and 125–125. The arrangement is such that the magnetrons may be moved into juxtaposition with the other portion of the elliptical housing.

Alignment of the curing apparatus with the path of travel of the drawn optical fiber and with other portions of the draw line is made easier with the apparatus of this invention. As is seen in the drawings, the magnetrons, the bulbs, the elliptical chamber, the center tube and the exhaust system all are supported from the base plate 68. Should there be misalignment of the center tube with optical fiber extending therethrough, a production technician causes the base plate to be moved in x and y directions to correct the misalignment. This may be accomplished by mounting the base plate on an x-y positioner (not shown). Further, the positioner may be provided with the capability of adjusting the orientation in the z direction thereby providing the capability of angular alignment of the reflectors and the optical fiber. Finally, the door to open is smaller, which helps the alignment process.

It is to be understood that the above-described arrangements are simply illustrative of the invention. Other arrangements may be devised by those skilled in the art which will embody the principles of the invention and fall within the spirit and scope thereof.

We claim:

1. Apparatus for curing drawn optical fiber, said apparatus including:
   a housing which is closed on a top and bottom, sides and rear face thereof and which has openings in a front face thereof, said housing including a plurality of members extending from the front face thereof;
   a pivotally moveable portion which is hingedly connected to said housing and adapted to be moved pivotally to expose an interior of said housing and an interior of said pivotally moveable portion;
   an elliptical chamber which has a portion disposed in said housing and a separable portion disposed in said pivotally moveable portion;
   a longitudinally extending bulb disposed at the focal point of the portion of the elliptical chamber which is disposed in said housing;
   a longitudinally extending center tube disposed at the other focal point of the elliptical chamber such that the pivotal movement of the pivotally moveable portion facilitates lateral removal of the center tube from the elliptical chamber, the center tube adapted to have drawn optical fiber extend therethrough;
   means disposed in said housing for exciting said bulb to cause said bulb to emit radiation to cure curable coating material which has been applied to the fiber; and
   exhaust means attached to said housing for exhausting gases from within said housing.

2. The apparatus of claim 1, wherein said rear face of said housing is provided with a filter.

3. The apparatus of claim 2, wherein each of said members extending from said housing is adapted to mate with portions of said pivotally moveable portion.

4. The apparatus of claim 3, wherein each of the mating portions of the housing and of the pivotally moveable portion includes a semi-circular opening such that said center tube is adapted to be received in aligned semi-circular openings of the members extending from the housing and such that the semi-circular openings in the pivotally moveable portion are adapted, when said pivotally moveable portion is closed, to engage the housing, to form circular openings in which the center tube is disposed.

5. The apparatus of claim 4, wherein the apparatus is oriented so that a longitudinal axis of the center tube is oriented vertically and wherein uppermost and lowermost openings through which the center tube extends are provided with sealing members.

6. The apparatus of claim 5, wherein said sealing members comprise gasket seals.

7. The apparatus of claim 5, wherein one portion of said elliptical chamber is disposed in said housing and the other portion of said elliptical chamber is disposed in said pivotally moveable portion with said center tube disposed in said other portion of said elliptical chamber.

8. The apparatus of claim 7, wherein said members extending from said housing include triangular members with said semi-circular openings being formed in the hypotenuse of each triangular member.

9. The apparatus of claim 8, wherein said housing includes a vertically extending strip which spans across portions of said triangular members and which includes a longitudinally extending sealing surface which is adapted to engage at least one longitudinally extending sealing surface of said pivotally moveable member when said pivotally moveable member is closed upon said housing.

10. Apparatus for curing drawn optical fiber, said apparatus including vertically stacked sections each of said section being an apparatus as set forth in claim 9.

11. The apparatus of claim 9, wherein said housing includes guide means which extend past said rear face of said housing and toward said front face of said housing.

12. The apparatus of claim 11, wherein said means for exciting said bulb includes magnetron means which together with a portion of said elliptical chamber and said bulb has been moved slidably along said guide means into juxtaposition with said center tube in the other portion of said elliptical chamber to facilitate excitement of said bulb with said magnetron means.

13. The apparatus of claim 12, wherein said triangular members include gusset plates, the apparatus which also includes exhaust means attached to said gusset plates with said exhaust means including openings which communicate with said pivotally moveable means to provide an air flow path from said filter past said magnetron and through said elliptical chamber, through said openings in said exhaust means and out through said exhaust means.

* * * * *